March 13, 1928.
G. M. EATON
FLEXIBLE GEAR
Filed March 24, 1924
1,662,493
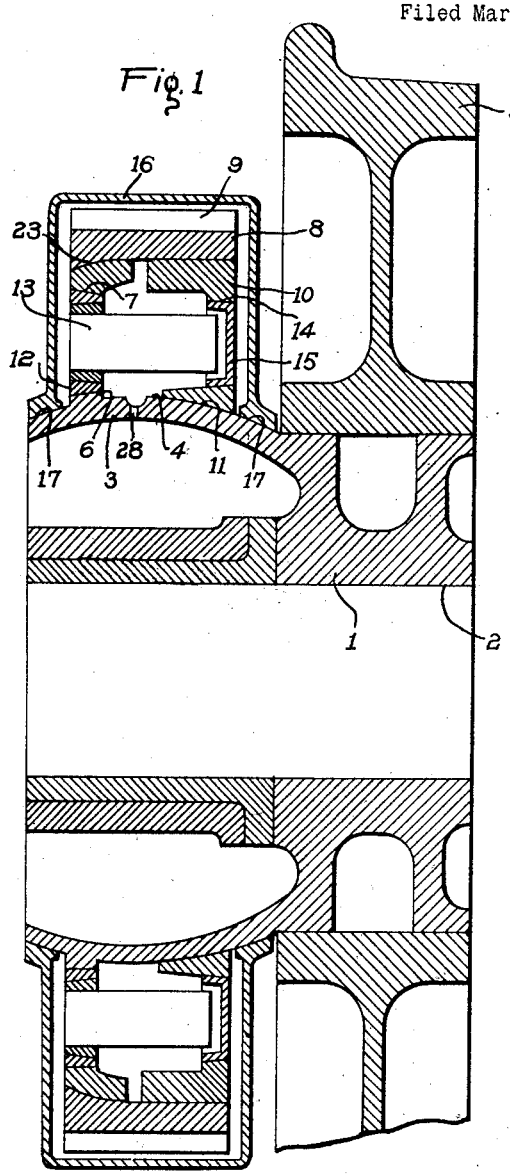
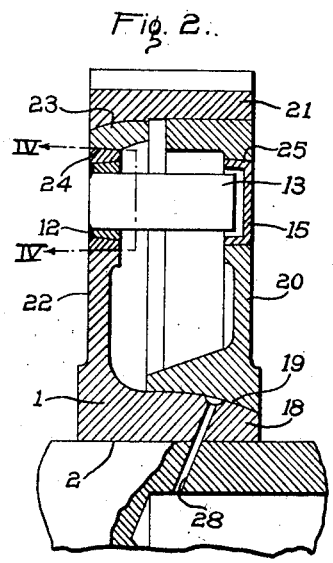
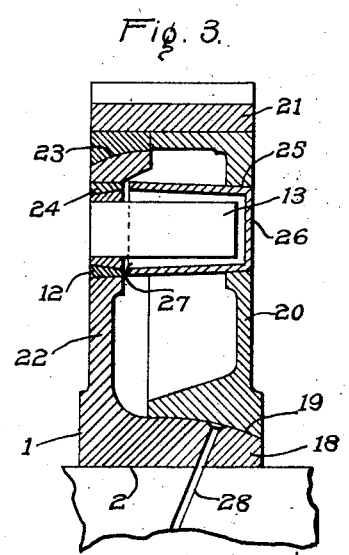
WITNESSES:
INVENTOR
George M. Eaton.
BY
Wesley G. Carr
ATTORNEY Patented Mar. 13, 1928.

1,662,493

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed March 24, 1924. Serial No. 701,353.

My invention relates to flexible gear elements, more particularly to flexible gearwheels having a spherically-curved hub portion to provide limited universal movement of the toothed gear rim.

It is among the objects of my invention to provide a flexible gear-wheel of simple, compact and durable mechanical construction, which shall be particularly adapted for railway service to couple the drive shafts or jack-shafts of the drivers with the motor armatures.

It is a further object of my invention to provide a flexible gear element employing a novel form of spring element that is particularly adapted for use in gear-wheels of relatively small diameters.

It is a still further object of my invention to provide a flexible gear-wheel of the above-designated character, having a casing member that is adapted to fit on the sphericallycurved portion of the gear hub to provide a sealed lubricating chamber.

Various forms of flexible universally movable gear elements have been proposed in which the hub and rim members are relatively movable and resiliently restrained by interposed spring elements of either the coil or the leaf-spring type, the latter being constructed in the form of spring nests which have their bases fitted or secured in the hub or rim portion and their extending spring leaves engaging with the complementary member.

My present invention is directed to such a wheel structure, in which the hub portion may constitute an independent unit or an extending hub portion of a wheel, the hub being provided with a radial flange having symmetrically spaced openings for receiving the bases of a plurality of spring nests and the gear rim having a radial flange provided with a complementary seating surface for providing a movable or bearing fit with the spherically-curved portion of the hub. The rim flange is provided with openings for receiving the projected leaves of the spring elements, the longitudinal axes of which are disposed axially relative to the hub portion.

I further provide a casing, the sides of which are flanged and provided with spherically-curved faces for engagement with the hub member to provide a dust-proof housing, which also constitutes a lubricating chamber.

In the accompanying drawing constituting a part hereof and in which like reference characters designate like parts:

Figure 1 is a view in longitudinal cross section of a flexible element embodying the principles of my invention, Fig. 2 is a similar view of a modification of the structure shown in Fig. 1, and Fig. 3 is a view in longitudinal cross section of such a wheel element having a special form of wearing shoe for the spring elements.

Referring to Fig. 1, the structure therein illustrated comprises a compound hub 1 having a central opening 2 by which it may be secured on an axle or shaft, and also having an extending portion 3 comprising a substantially spherically-curved seating portion 4. A car wheel 5 is shrunk on the cylindrical end of the hub 1 and near its other end the hub is provided with a circumferential flange 6 having a plurality of cylindrical openings 7 therein.

A rim member 8 having gear teeth 9 in the outer periphery thereof and a radial, flanged portion or spider 10, is seated on the hub portion 3. The lower portion 11 of the spider 10 is shaped complementary to the spherically-curved surface 4 of the hub portion 3.

A plurality of spring elements each comprising a cylindrical base 12 and a plurality of projecting spring leaves 13 rigidly associated therewith, are disposed in the openings 7 of the hub flange, with the longitudinal axes of the spring leaves 13 extending axially of the hub. The spider 10 is provided with openings 14 adapted to receive wearing shoes 15 of manganese alloy or the like, for the springs, which shoes are also utilized to facilitate assembly or disengagement of the spring units. The extending or free portions of the spring leaves 13 engage the shoes 15 for the purpose of transmitting torque from the rim to the hub.

A gear case 16 is disposed around the gear member 8 and secured to the hub portion 3 by spherically shaped seating portions 17, which permit limited universal movement of the hub 1. The engagement of the surfaces 11 and 17 with the spherically-curved surface of the hub is in the nature of a bearing fit, which permits relative movement of the co-operating members, and the upper portion of the hub flange 6, which engages with the gear rim 8, is spherically curved for the same reason.

In operation, torque is transmitted from the gear rim 8, which is ordinarily co-operatively engaged with the pinion member of a motor, through the spider 10, and the spring leaves 13, to the hub flange 6 or vice versa, if the rim be driven from the hub. The illustrated structure permits of relative movement of the rim and the hub, and the spring elements function to yieldingly restrain angular movements thereof.

To remove the spring elements, the shoes 15 are driven inwardly against the ends of the spring leaves 13 to force the spring bases 12 out of the openings 7.

The structure shown in Fig. 2 differs from that of Fig. 1, principally in that the hub portion 1 is a unitary member, independent of a car wheel or other supporting element, and is provided with an extension 18 having a spherically-curved surface 19, which is adapted to fit a complementary shaped portion of a spider 20 to which the gear rim 21 is secured, as by shrinking. A radially extending flange 22 of the hub 1 has a spherical seating engagement 23 with the rim 21, as in Fig. 1, and is provided with a plurality of openings 24 for receiving the bases 12 of the spring nests 13, which are disposed similarly to those shown in Fig. 1. The substantially cup shape wearing shoes 15 are inserted in openings 25 of the spider 20.

In Fig. 3, I have shown a modified form of wearing shoe 26, which is of such length that the open end 27 of a shoe will engage the corresponding base 12 of the springs 13 before the free ends of the leaves of the spring elements bottom in the base of the shoe. This structure adapts the cup member 26 to the removal of the spring elements by allowing them to be pushed through the openings 25 without destroying the spring leaves 13.

It is evident from the above description of my invention that flexible elements made in accordance therewith provide simple and efficient means for obtaining limited universal movement of a gear rim on its supporting hub while being resiliently restrained against angular movement thereon. The structures I have illustrated also provide adequate lubrication for the engaging parts since the space between the hub and rim flanges or spiders may constitute a lubricating chamber, which is supplied through suitable openings 28 in the hub portion.

Although I have described a specific embodiment of my invention, it will be obvious to those skilled in the art that various modifications may be made in the details of construction, in the design and proportion of the several co-operating parts and in the manner of applying my invention without departing from the principles herein set forth.

I claim as my invention:—

1. A flexible element comprising a hub portion, a rim portion and spring elements co-operatively engaging the same, said spring elements comprising a cylindrical base having spring leaves extending therefrom and axially disposed with respect to said hub portion.

2. A flexible element comprising a hub portion, a rim portion and spring elements co-operatively engaging the same, said spring elements comprising a cylindrical base having spring leaves extending therefrom and axially disposed with respect to said hub portion, said hub and rim portion being relatively movable.

3. A flexible element comprising a hub portion, a rim portion and spring elements co-operatively engaging the same, said spring elements comprising a cylindrical base having spring leaves extending therefrom and axially disposed with respect to said hub portion, said rim being universally rotatable on said hub.

4. A flexible element comprising a hub member having a spherically-curved seating portion, a rim having a movable fit on said portion, and a plurality of spring elements comprising bases having leaf springs secured thereto, the leaves of said springs extending axially of said hub.

5. A flexible element comprising a hub member having a spherically-curved seating portion, a rim having a movable fit on said portion, and a plurality of spring elements comprising bases having leaf springs secured thereto, the bases of said springs being secured in said hub and the leaves thereof being disposed axially of said hub and adapted to engage said rim.

6. A flexible element comprising a hub having a spherically-curved seating portion and a radial flange extending therefrom, a rim having a depending flange portion for engaging the curved portion of said hub, and spring elements extending axially of said hub and rim and having their respective ends disposed in openings provided in the flanges of said hub and rim.

7. A flexible element comprising a hub having a spherically-curved seating portion and a radial flange provided with openings, a rim portion adapted to engage said curved portion and having openings in substantial alinement with the openings of said hub, and spring nests comprising bases secured in the openings of said hub flange and spring shoes secured in the openings of said rim, the leaves of said springs being disposed axially of said hub and adapted to engage the shoes of said rim.

8. A flexible element comprising a hub having a spherically-curved seating portion and a radial flange provided with openings, a rim portion adapted to engage said curved portion and having openings in substantial alinement with the openings of said hub, and spring nests comprising bases secured in the openings of said hub flange and wearing shoes of manganese alloy secured in the openings of said rim, the leaves of said springs being disposed axially of said hub and adapted to engage the shoes of said rim.

9. The combination with a spherically-curved hub, of a complementary rim having a movable fit therewith, a plurality of spring elements disposed axially thereof, and a casing movably mounted on said hub.

10. The combination with a spherically-curved hub, of a complementary rim portion and a casing having spherically-curved seating portions for engaging said hub.

11. The combination with a spherically-curved hub, of a complementary rim portion, axially disposed spring elements for yieldingly restraining the relative movement of said rim and hub, and a casing having spherically-curved seating portions for engaging said hub.

In testimony whereof I have hereunto subscribed my name this 17th day of March 1924.

GEORGE M. EATON.